(12) United States Patent
Campbell

(10) Patent No.: US 6,532,005 B1
(45) Date of Patent: Mar. 11, 2003

(54) AUDIO POSITIONING MECHANISM FOR A DISPLAY

(75) Inventor: Lowell Campbell, Carlsbad, CA (US)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 09/335,805

(22) Filed: Jun. 17, 1999

(51) Int. Cl.⁷ .............................. G09G 5/00
(52) U.S. Cl. .................. 345/173; 345/727; 345/728
(58) Field of Search ................. 345/173–179, 345/727–729

(56) References Cited

U.S. PATENT DOCUMENTS 5,552,089 A * 9/1996 Kikinis et al. ............... 345/173
6,297,818 B1 * 2/2001 Ulrich et al. ................ 345/326

* cited by examiner

*Primary Examiner*—Richard Hjerpe
*Assistant Examiner*—Duc Q. Dinh
(74) *Attorney, Agent, or Firm*—Harness, Dickey & Pierce, PLC

(57) ABSTRACT

An audio positioning mechanism for a display assigning each position on the display with an audio signal that allows a user to identify positions on the display by hearing.

11 Claims, 2 Drawing Sheets

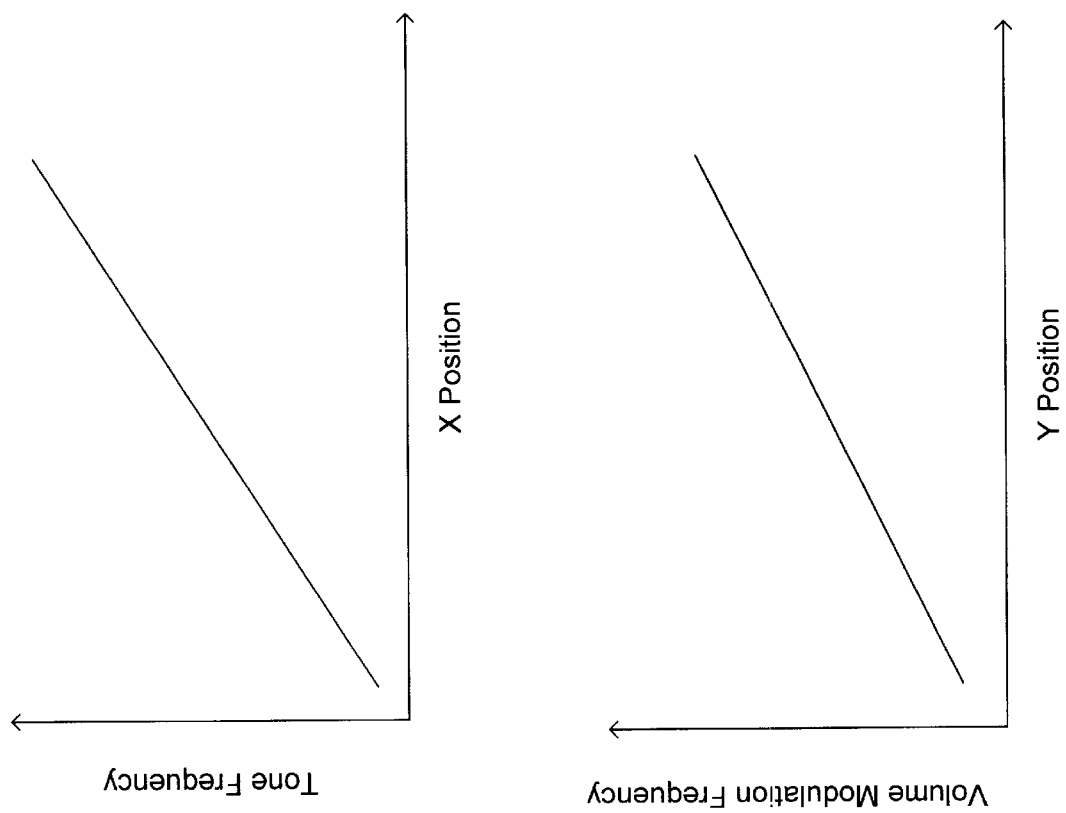

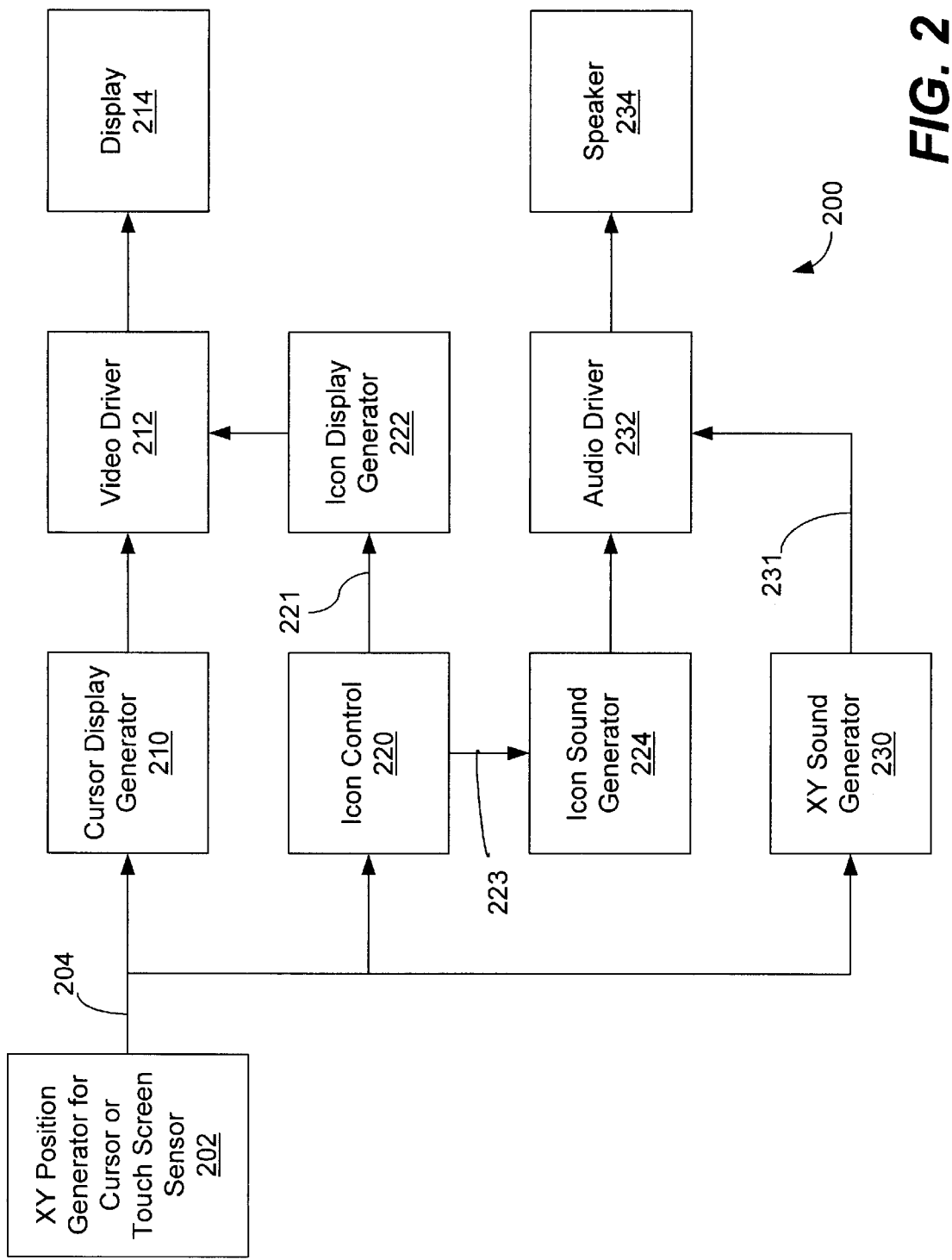

AUDIO POSITIONING MECHANISM FOR A DISPLAY

TECHNICAL FIELD

The present specification relates to a device having a display, and more particularly to an electronic device that uses a cursor on a display or a touch screen as a user interface.

BACKGROUND

A display is widely used in many devices to present visual contents or objects which include text, graphics, images, video, and icons for documents or software. Various electronic devices may use displays to provide a user interfacing mechanism so that a user can control certain operations of these devices. Some examples of these electronic devices include personal digital assistants (PDAs), certain desktop or portable telephones, and many computers or computer-based systems, to name a few.

Different techniques have been developed to allow a user to control some operations of an electronic device through its display. One example is to use a cursor on the display to point at a desired location or to select one or more objects on the display. A pointing device, such as a mouse, a track ball, a track pad, a track point stick, one or more keys on a keyboard, or some control buttons or wheels, may be used to control the cursor position on the display. Many such devices require a user to visually determine a desired position of the cursor while using the pointing device to move the cursor.

Another example of using a display as a user interface is touch screens. A touch screen has sensors arranged on a display panel. A user can visually locate a desired location or object on the screen and simply touch the screen to perform an operation.

Hence, the above and many other user interfacing techniques through the display operate based on a user's ability to see, and particularly, the user's ability to visually identify an location or object on the display. This requirement may limit the user's use of the device when the user is visually impaired by some physical condition (e.g., poor vision or blindness) or other reasons (e.g., the display is too dim to see under strong background light).

In particular, as electronic information and communication devices become more and more available and accessible to the general public, it is increasingly desirable to implement special features in such devices so that they are accessible to physically disabled users such as visually impaired users. Americans with Disabilities Act of 1990 represents the legislative effort to meet such need.

SUMMARY

In recognition of the above, the present disclosure provides an audible positioning feature in association with the positioning on a display. At least one distinct audio signal is assigned to each position on the display. As a user moves a cursor from one position to another on the display or touch different spots on a touch screen, the audio signal changes accordingly. Hence, a user can locate and identify a position on the display solely by hearing its associated audio signal, without actually watching the display.

Each audio signal may include two audio parameters that respectively change along two different directions in the display. The two audio parameters produce different audible effects in the audio signal to indicate positions along the two different directions. The tone frequency, volume, or the frequency of volume modulation of the audio signal, for example, may be used as such parameters.

Visual objects such as icons on the display may be assigned with unique sounds. When a cursor points at an icon or a user touches the icon on a touch screen, a unique sound associated with that icon is produced to inform the user. The sound may include a voice that indicates the content represented by the icon.

One embodiment of an electronic device having a display with the above audio positioning mechanism includes a video driver and a display coupled to produce an image, a position circuit operable to select any point on the display in response to a user input, and a positioning sound driver coupled to the position circuit to produce different audio signals for different positions on the display. The position circuit is designed to produce first and second coordinates of a point on the display to define its position in a coordinate system having first and second axes intercepting each other. The position sound driver produces two distinct audio effects to indicate the position change along the two axes to a user by audio.

These and other aspects and associated advantages will become more apparent in light of the detailed description, the accompanying drawings, and the appended claims.

BRIEF DESCRIPTION OF THE DRAWINGS

FIG. 1A shows a linear position dependence of the tone frequency of a position audio signal along the X-axis of a display.

FIG. 1B shows a linear position dependence of the modulation frequency for modulating the volume of a position audio signal along the Y-axis of a display.

FIG. 2 shows a block diagram of a portion of functional blocks of an electronic device having a display with audio positioning signals according to one embodiment.

DETAILED DESCRIPTION

Techniques and devices described in this specification use a set of audio positioning signals to identify positions on a display of a device. As a user moves a position indicator (e.g., a cursor controlled by a pointing device) from one position to another on the display or touches different spots on a touch screen, a unique audio positioning signal is generated accordingly at each position. Hence, a user can locate and identify a position on the display solely by hearing its associated audio positioning signal, without the need to actually watch the screen.

In general, the audio positioning signal is a function of the position on the display. The audio positioning signal may change progressively or monotonically in a manner to allow a user to identify different positions by hearing. As the position changes, one or more audio parameters of the audio positioning signal change accordingly to indicate the change of the position on the display. The audio positioning, signal for each position may include two distinct audio parameters that are audibly distinct from each other. The first audio parameter changes with the position along a first direction (e.g., the horizontal X-axis direction) and the second audio parameter changes with the position along a second direction different form the first direction (e.g., the vertical Y-axis direction).

In one embodiment, the audio positioning signal may be an intermittent tone pulse that changes with the position in the display. The first audio parameter may be the tone frequency of the audio positioning signal which changes in a monotonic manner with the X-axis position. The second audio parameter may be the modulation frequency of the volume of the audio positioning signal which changes monotonically with the Y-axis position and appears as a repetitive beep sound with a changing beep frequency. If the tone frequency and the modulation frequency increase with x and y positions, respectively, a low frequency tone and a low beep frequency indicate a position in the left lower corner of the display, and conversely, a high frequency tone and the high beep frequency indicate a position in the right upper corner of the display. FIGS. 1A and 1B show the tone frequency and the volume modulation frequency of an exemplary audio positioning signal as linear functions of x and y positions. Alternatively, the volume of the audio positioning signal may be varied along either X or Y direction.

The visual objects on the display may be assigned with unique audio indicators to allow a user to know what is on the display by hearing in addition to the audio positioning signals. A visual object may be an icon for a folder, a document, or an application. When the user selects or traces through an object on the display, an audible indicator is produced to identify the object. For example, the audio indicator may be a synthesized voice that briefly explains the content of that object. A user can explore the objects on the display by scanning through the entire display with the cursor or by touching the touch screen.

FIG. 2 shows one embodiment of an electronic device 200 having a display with audio positioning signals. Only a portion of the functional blocks of the device are shown. Some of these functional blocks may be integrated in a common circuit. The device 200 may be a PDA, a wireless telephone, a computer, or any other electronic device that uses the display as an user interface.

A XY position generator 202 produces position coordinates 204 indicating the position of the cursor, or the point where the touch screen is touched. Any coordinate system other than a Cartesian system with x, y coordinates may be used to define a position along two axes that intercept each other. A XY sound generator 230 receives the position coordinates and produces a respective audio control signal 231 according to a predetermined relation such as the linear functions shown in FIGS. 1A and 1B. The driver 230 could be a voltage-controlled oscillator, for example. An audio driver 232 responds to the audio control signal 231 to produce an audio positioning signal that represents the position. The audio driver 232 may be an amplifier or a voice coder circuit in a digital portable telephone. The position coordinates 204 is also sent to a cursor display generator 210 and a video driver 210 to place a cursor image on the right location on the display 214.

An icon control 220 may also be provided to compare the position of the cursor or the touch point with the boundaries of icons on the display. If the coordinates 204 fall within an icon, two icon control signals 221 and 223 are generated. The first control signal 221 commands an icon display generator 222 and hence the video driver 212 to change the appearance of that icon image on the display 214 to indicate that the icon is selected or "highlighted". The second control signal 223 commands an icon sound generator 224 to produce a distinctively unique sound associated with that selected icon to audibly inform the user by using the audio driver 232 and the speaker 234. For example, a synthesized voice may be generated to announce the icon name or its function.

The above audio features associated with the display may be configured in a way that a user can activate or disable them by a user input by, for example, using one or more keys.

Although only a few embodiments are described, various modifications and enhancements may be made without departing from the spirit of the following claims.

What is claimed is:

1. A method for using audio signals to locate positions on a display, comprising:

generating first and second coordinates of each point on a display in a coordinate system having first and second axes;

providing a positioning tool to allow a user to locate positions on the display;

assigning each coordinate on the display with an audio signal, wherein each audio signal includes a first audio parameter which changes with the first coordinate to produce a first audible effect indicating a position change along the first axis, and a second audio parameter which changes with the second coordinate to produce a second audible effect that is audibly different from the first audible effect and indicates a position change along the second axis; and producing an audio signal with the first and second audible effects to indicate a position on the display when the position is selected by the user.

2. A method as in claim 1, wherein the positioning tool includes a touch screen having positioning sensors.

3. A method as in claim 1, wherein the positioning tool includes a pointing device coupled to control a cursor on the display.

4. A method as in claim 1, further comprising assigning a unique sound to each of a plurality of selectable positions on the display to audibly inform the user when a position is selected.

5. A method as in claim 4, wherein said selectable position is an icon, and a sound assigned to an icon includes a voice to indicate the content represented by the icon.

6. An electronic device having a display, comprising:

a display operable to produce an image;

a video driver coupled to control said display;

a position circuit operable to select any position on said display in response to a user input and to produce first and second coordinates of the point to define its position on the display in a coordinate system having first and second axes; and a positioning sound generator coupled to said position circuit to produce different audio signals for different positions on said display, wherein each audio signal is audibly different from another audio signal and includes a first audio parameter which changes with the first coordinate to produce a first audible effect indicating a position change along the first axis, and a second audio parameter which changes with the second coordinate to produce a second audible effect that is audibly different from the first audible effect and indicates a position change along the second axis.

7. A device as in claim 6, wherein said display includes a touch screen having positioning sensors that are coupled to said position circuit.

8. A device as in claim 6, further comprising a pointing device coupled to said position circuit to control a cursor on the display in response to said user input.

9. A device as in claim 6, further comprising:

a icon control circuit coupled to said position circuit, operating to determine whether a selected position in response to said user input overlaps an icon on the display; and an icon sound generator coupled to said icon control circuit and configured to produce an icon sound uniquely assigned to an icon that overlaps said selected position to audibly inform the user.

10. A device as in claim 9, wherein said icon sound generator is further configured to produce a voice that identify the content represented by the icon.

11. A device as in claim 9, wherein said icon sound generator is a voice coder circuit of a digital portable telephone.

* * * * *